(12) United States Patent
Ralph et al.

(10) Patent No.: US 11,801,942 B2
(45) Date of Patent: Oct. 31, 2023

(54) INTEGRATED MEAL TRAY FOR PASSENGER SEAT WITH LOW-PROFILE PULL-STYLE LATCH

(71) Applicant: B/E Aerospace, Inc., Winston-Salem, NC (US)

(72) Inventors: Neil M. Ralph, Winston-Salem, NC (US); Gianpaolo Malatrasi, Rural Hall, NC (US); Ryan J. Suhre, Winston-Salem, NC (US); Stephen A. Puglisi, Greensboro, NC (US); Bradford D'Alessio, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/707,162

(22) Filed: Mar. 29, 2022

(65) Prior Publication Data

US 2023/0312101 A1    Oct. 5, 2023

(51) Int. Cl.
*B64D 11/06* (2006.01)
(52) U.S. Cl.
CPC .................. *B64D 11/0638* (2014.12)
(58) Field of Classification Search
CPC .......................... B60N 3/004; B64D 11/0638
USPC .......................................... 297/163, 146, 147
See application file for complete search history.

(56) References Cited

U.S. PATENT DOCUMENTS

| 2,619,395 | A | * | 11/1952 | Kent | B60N 3/004 297/146 |
| 4,511,178 | A | * | 4/1985 | Brennan | B64D 11/0638 297/440.1 |
| 4,973,017 | A | * | 11/1990 | Takagi | B60N 2/757 297/146 |
| 6,550,861 | B1 | * | 4/2003 | Williamson | B64D 11/0638 297/173 |

(Continued)

FOREIGN PATENT DOCUMENTS

| CN | 204845641 U | 12/2015 |
| CN | 108860619 A | 11/2018 |

(Continued)

OTHER PUBLICATIONS

Extended European Search Report dated Aug. 2, 2023; European Application No. 23163544.2.

*Primary Examiner* — Jose V Chen
(74) *Attorney, Agent, or Firm* — Suiter Swantz po llo

(57) ABSTRACT

A passenger seat rear-mounted meal tray assembly with a low-profile inline latch includes a meal tray substantially contoured to the seatback surface and a latch pin assembly mounted within the meal tray beneath the seatback surface, the latch assembly including a latch pin for engaging with the seatback to hold the meal tray in the stowed configuration. The meal tray includes a handle likewise contoured to the exterior surface of the tray, the handle having an outer face articulable by a passenger to pivot the handle and disengage the latch pin from the seatback. Disengaging the latch pin via the handle releases the meal tray by the handle into the hand of the passenger, who may manually pivot the (Continued)

tray into a substantially horizontal deployed configuration. The meal tray may similarly be restowed to the seatback (e.g., by pushing the tray back into stowed position) without engaging the handle.

15 Claims, 9 Drawing Sheets

(56) References Cited

U.S. PATENT DOCUMENTS

| | | | |
|---|---|---|---|
| 8,702,163 B2* | 4/2014 | Westerink | B60N 3/004 |
| | | | 297/146 |
| 9,126,688 B2 | 9/2015 | Philipzik et al. | |
| 2019/0184885 A1* | 6/2019 | Preisler | A47B 1/10 |
| 2020/0172250 A1* | 6/2020 | Drenzeck | B64D 11/0636 |
| 2021/0394906 A1* | 12/2021 | Smith | B64D 11/0638 |
| 2023/0073857 A1* | 3/2023 | Chavarria Garcia | |
| | | | B64D 11/0636 |

FOREIGN PATENT DOCUMENTS

| | | |
|---|---|---|
| CN | 110422095 A | 11/2019 |
| CN | 113247267 A | 8/2021 |
| DE | 10333912 | 6/2009 |
| JP | 4994893 B2 | 8/2012 |
| KR | 1020050115005 A | 12/2005 |
| KR | 20060001037 A | 1/2006 |

\* cited by examiner

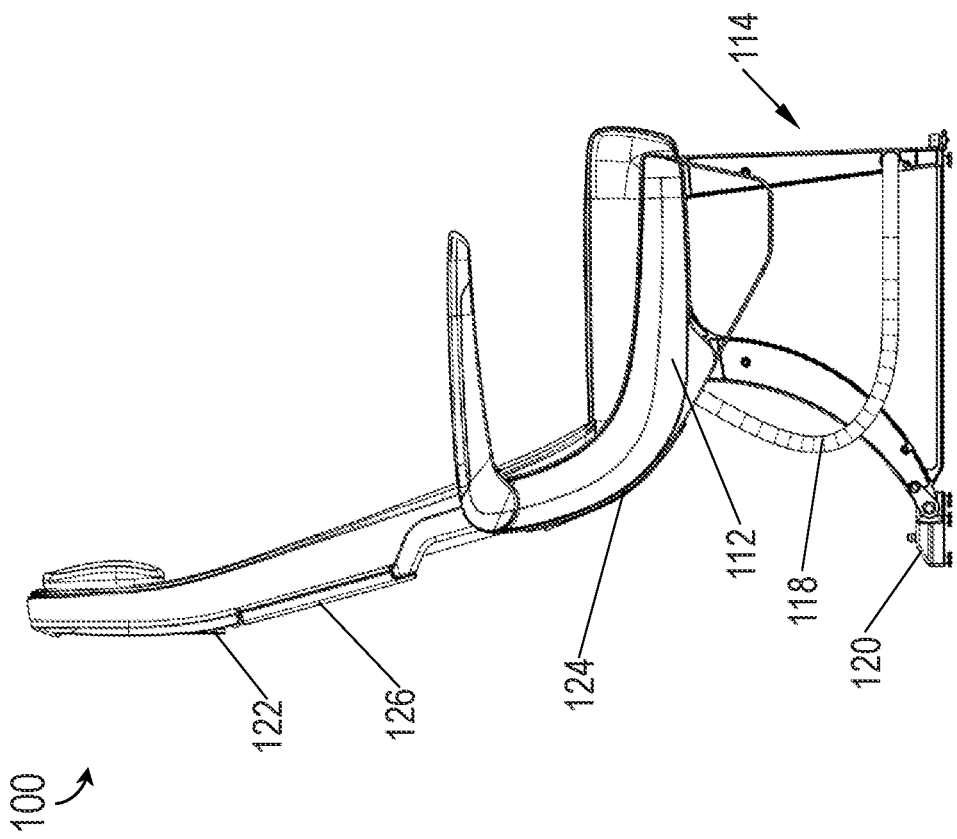
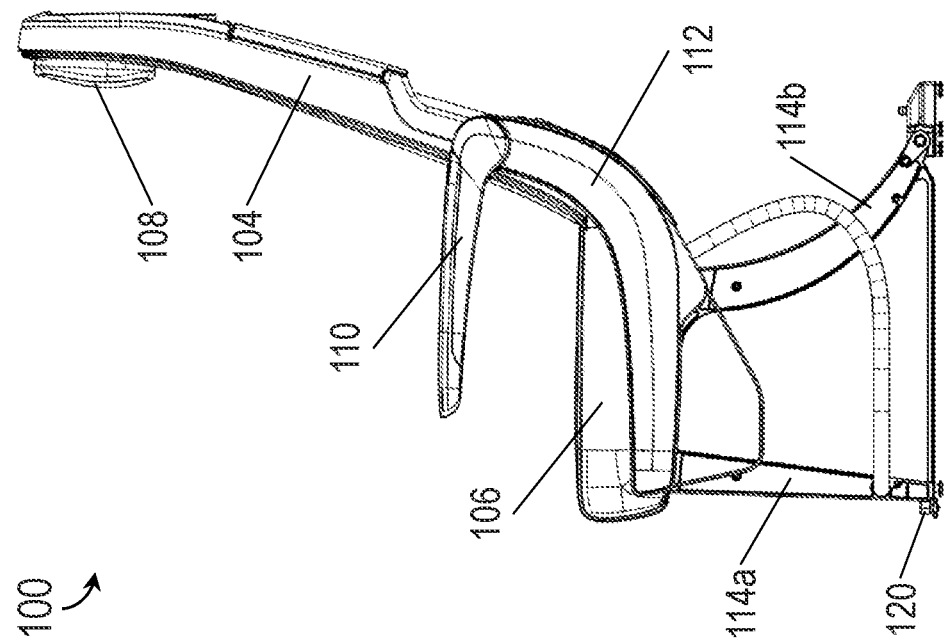

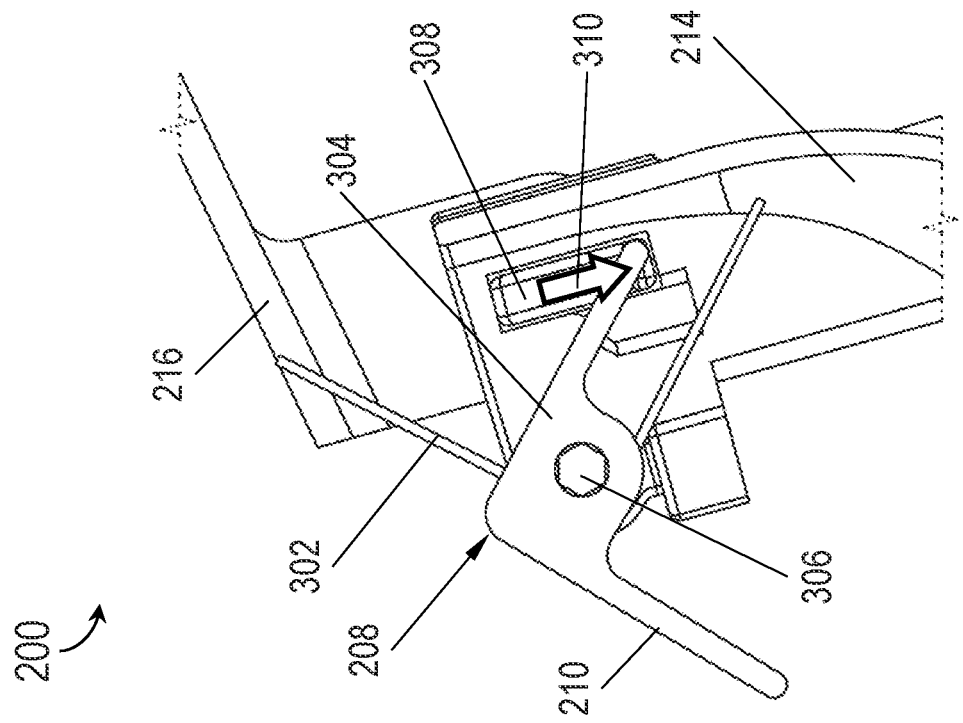
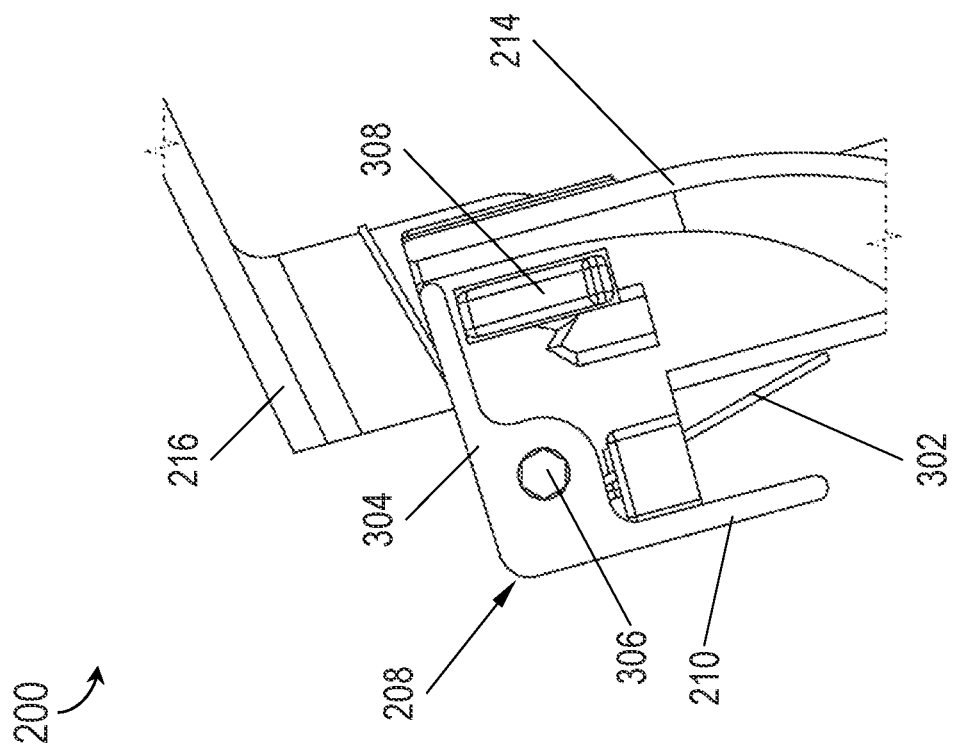
FIG. 3A
FIG. 3B

INTEGRATED MEAL TRAY FOR PASSENGER SEAT WITH LOW-PROFILE PULL-STYLE LATCH

BACKGROUND

Main cabin aircraft passenger seating generally provides meal trays operable by a passenger seated directly behind the seat to which the tray is attached. For example, conventional rear-mounted meal trays incorporate a barn door style latch involving the rotation of a handle by the passenger to release the tray for use and secure the tray back to its upright locked position. However, the handle tends to protrude from and disrupt the otherwise smooth lines of the rear seatback. Further, the handle is attached to the seatback, rather than the tray, such that deployment of the tray by rotating the handle will cause the tray to freely drop into its deployed position unless caught or restrained by the passenger.

More importantly, conventional tray latches may present a variety of safety hazards. For example, in a crash event the tray may self-disengage (e.g., if the handle is impacted), catching the head of a passenger or otherwise increasing the severity of potential head or neck injuries (e.g., HIC, Nij). The protruding handle may likewise catch the passenger's head and complicate HIC/Nij factors even if the tray remains stowed. Further, the protruding tray handle may catch on the clothing of passengers during egress or ingress, potentially trapping an evacuating passenger. For this reason, exit row seats may require tray stops customized to prevent inadvertent tray disengagement or passenger entrapment.

SUMMARY

In a first aspect, a passenger seat meal tray assembly with a low-profile inline latch is disclosed. In embodiments, the meal tray assembly includes a tray pivotably attached to a seatback (e.g., attached to the rear of a passenger seat for use by the passenger seated immediately behind said passenger seat). The tray has a stowed configuration, e.g., wherein the exterior surface of the tray flush with the seatback, and a deployed configuration, e.g., wherein the interior surface of the tray lies at a substantially horizontal angle for passenger use. The tray includes a latch pin assembly set into the upper end (e.g., when deployed, the end closest to the passenger) that is either engaged or disengaged with the seatback, and when engaged holds the tray in the stowed configuration via at least one spring. The tray assembly includes a handle capable of pivoting relative to the tray via a rotating shaft, the handle having an upper face and an outer face likewise flush with the exterior surfaces of the tray and the seatback when the handle is stowed. The outer face of the handle may be articulated by the passenger for whose use the tray is intended, e.g., via pivoting the handle upward into a release configuration. Pivoting the handle likewise disengages the latch pin assembly from the seatback and deploys the tray for passenger use.

In some embodiments, the upper and outer faces of the handle are substantially mutually perpendicular.

In some embodiments, the pivoting of the handle into the release configuration (e.g., by engaging the outer face) deploys the meal tray by engaging the latch pin assembly with the upper face of the handle.

In some embodiments, the latch pin assembly has an inner and an outer end, the outer end configured to engage a spring and the inner end having an angled surface. For example, the upper face of the handle engages the latch pin assembly via its angled surface.

In some embodiments, the latch pin assembly includes a latch pin at or near the outer end, the latch pin capable of maintaining the meal tray in the stowed configuration when engaged with the seatback, e.g., within a hole set into a striker fixed to the seatback. Engagement of the latch pin assembly, e.g., via the upper face of the handle, likewise disengages the latch pin from the striker, deploying the meal tray.

In some embodiments, the handle (e.g., via the upper face) re-engages the latch pin assembly with the seatback to return and secure the meal tray to its stowed configuration.

In some embodiments, the user may re-stow the tray, e.g., by re-engaging the latch pin assembly with the seatback, by pivoting or pushing the meal tray back into its stowed configuration without directly engaging the handle.

In a further aspect, a passenger seating assembly comprising one or more passenger seats is also disclosed. In embodiments, each passenger seat of the seating assembly has a meal tray assembly set into its seatback for use by a passenger occupying a seat directly behind that seat (e.g., within a similar seating assembly directly behind the first seating assembly). Each meal tray assembly includes a tray pivotably attached to a seatback (e.g., attached to the rear of a passenger seat for use by the passenger seated immediately behind said passenger seat). The tray has a stowed configuration, e.g., wherein the exterior surface of the tray flush with the seatback, and a deployed configuration, e.g., wherein the interior surface of the tray lies at a substantially horizontal angle for passenger use. The tray includes a latch pin assembly set into the upper end (e.g., when deployed, the end closest to the passenger) that is either engaged or disengaged with the seatback, and when engaged holds the tray in the stowed configuration via at least one spring. The tray assembly includes a handle capable of pivoting relative to the tray via a rotating shaft, the handle having an upper face and an outer face likewise flush with the exterior surfaces of the tray and the seatback when the handle is stowed. The outer face of the handle may be articulated by the passenger for whose use the tray is intended, e.g., via pivoting the handle upward into a release configuration. Pivoting the handle likewise disengages the latch pin assembly from the seatback and deploys the tray for passenger use.

In some embodiments, the upper and outer faces of each handle are substantially mutually perpendicular.

In some embodiments, the pivoting of each handle into the release configuration (e.g., by engaging the outer face) deploys the respective meal tray by engaging the latch pin assembly with the upper face of the handle.

In some embodiments, each latch pin assembly has an inner and an outer end, the outer end configured to engage a spring and the inner end having an angled surface. For example, the upper face of the handle engages the latch pin assembly via its angled surface.

In some embodiments, each latch pin assembly includes a latch pin at or near the outer end, the latch pin capable of maintaining the meal tray in the stowed configuration when engaged with the seatback, e.g., within a hole set into a striker fixed to the seatback. Engagement of the latch pin assembly, e.g., via the upper face of the handle, likewise disengages the latch pin from the striker, deploying the meal tray.

In some embodiments, each handle (e.g., via the upper face) re-engages the latch pin assembly with the seatback to return and secure the meal tray to its stowed configuration.

In some embodiments, the user may re-stow the tray, e.g., by re-engaging the latch pin assembly with the seatback, by pivoting or pushing the meal tray back into its stowed configuration without directly engaging the handle.

In some embodiments, the passenger seating assembly includes a group of two to five passenger seats embodied in (e.g., mounted to the floor of) an aircraft passenger cabin.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 1A through 1F are respectively forward, rear, top, bottom, left-side, and right-side views of a vehicle passenger seating assembly;

FIGS. 3A and 3B are profile views of the low-profile handle of the integrated meal tray of FIGS. 2A and 2B in respectively a stowed configuration and a release configuration;

DETAILED DESCRIPTION

Figure 1A:
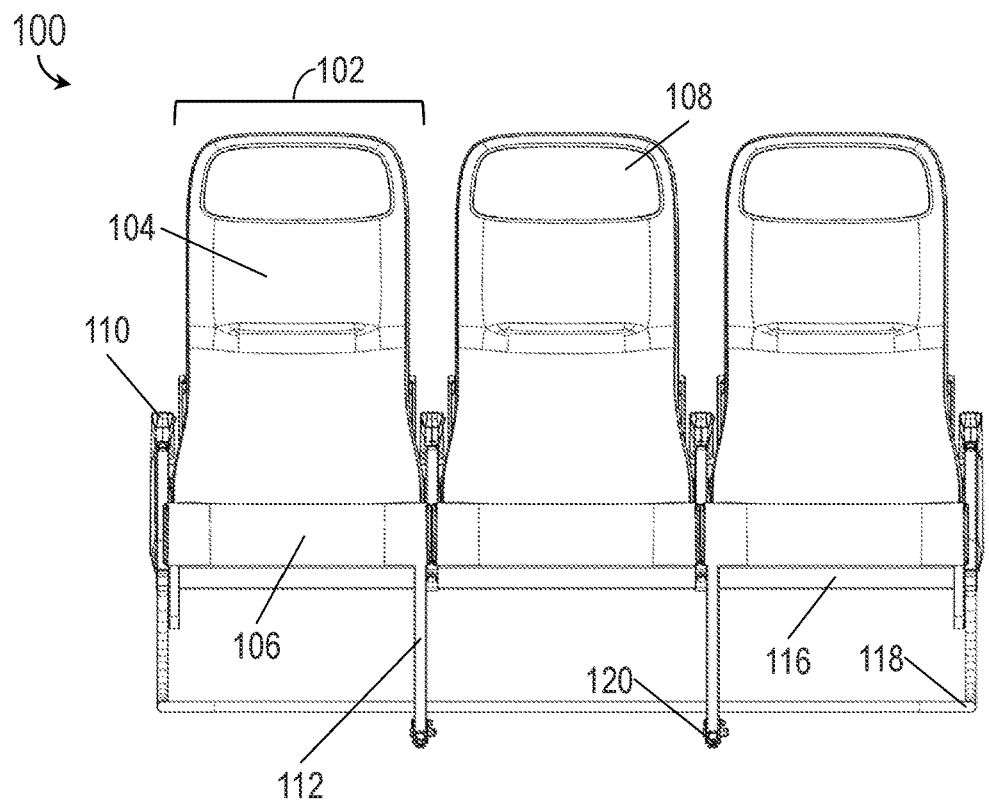
Figure 1B:
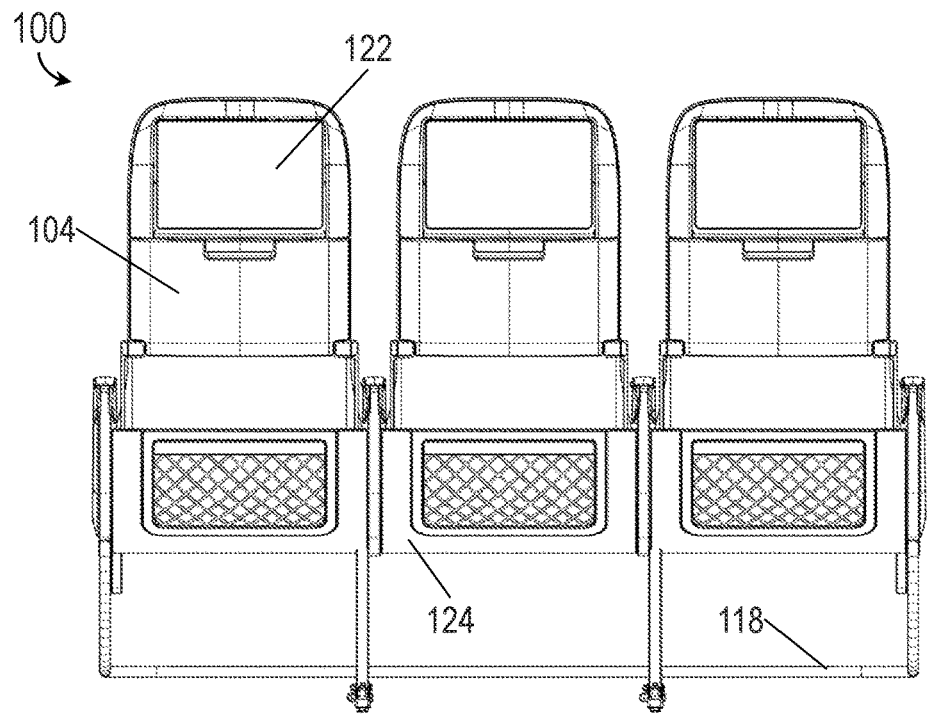
Figure 1C:
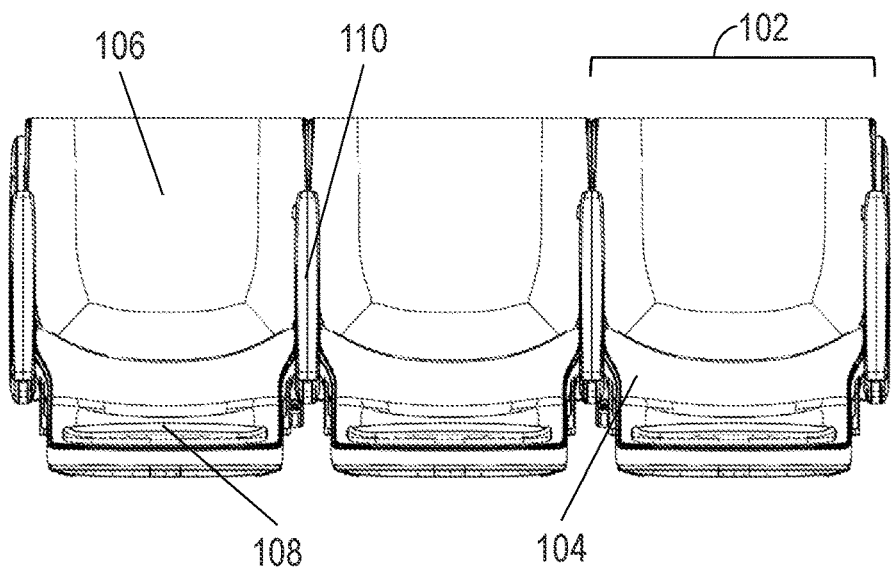
Figure 1D:
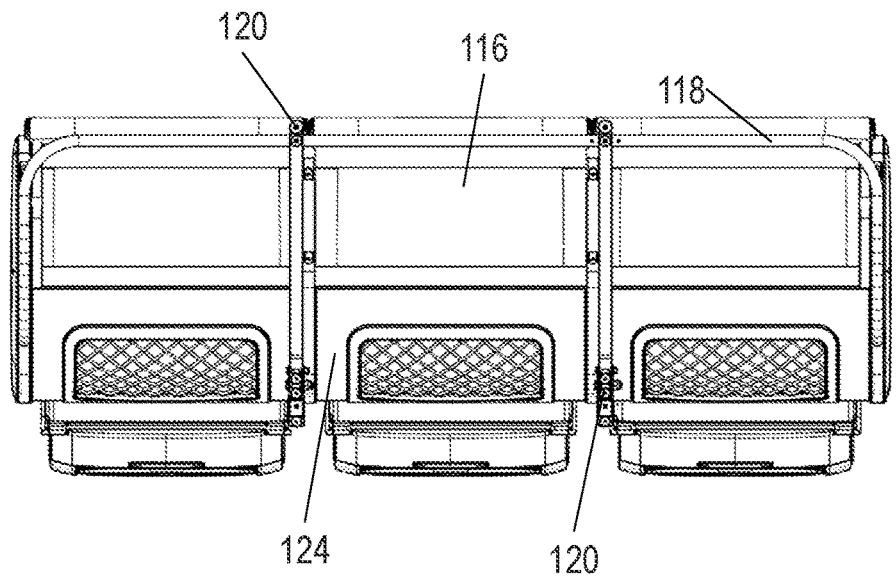

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally to FIGS. 1A through 1F, a passenger seating assembly 100 is disclosed. The seating assembly 100 may include passenger seats 102, seatback 104, seat cushion 106, headrest 108, armrest 110, seat spreader 112, legs 114, seatpan 116, baggage rail 118, and track fittings 120.

In embodiments, the passenger seating assembly 100 may be implemented in a passenger cabin of an aircraft, e.g., in an economy class cabin. For example, the passenger seating assembly 100 is shown by FIGS. 1A through 1F as comprising a group of three passenger seats 102 (e.g., a window seat, middle seat, and aisle seat), but may alternatively be implemented as a group of two or more seats, e.g., two, four, or five seats depending upon the desired cabin configuration. In embodiments, each passenger seat 102 may support an occupying passenger, e.g., via the seatback 104 and seat cushion 106. Individual passenger seats 102 may be separated from each other by seat spreaders 112 and armrests 110 attached thereto; armrests, for example, may include buttons or switches (not shown) for reclining the seatback 104.

In embodiments, the passenger seating assembly 100 may be fixed to a cabin floor of the passenger cabin via the legs 114 and track fittings 120. For example, whether two, three, four, or five passenger seats 102 are incorporated, the passenger seating assembly 100 may include two legs 114 (each leg comprising, e.g., a forward leg 114a and a rear leg 114b, referring in particular to FIGS. 3E and 3F), each of the forward leg and the rear leg attached by a track fitting 120 to a track (e.g., a set of two parallel tracks (not shown) extending along the passenger cabin in a substantially longitudinal direction).

In embodiments, the passenger cabin may incorporate multiple rows of passenger seating assemblies 100, each row including a group of passenger seating assemblies in various configurations (e.g., 2-3, 3-3, 3-4-3, 2-5-2, etc.) and each passenger seating assembly including features for use by passengers occupying the passenger seating assembly directly aft. For example, each passenger seating assembly 100 may include a baggage rail 118 to accommodate carry-on luggage and personal items placed under a passenger seat 102 by the passenger occupying the passenger seat directly aft. Similarly, each passenger seat 102 may incorporate an IFE device 122, literature compartment 124, and/or other features accessible to the passenger occupying the passenger seat directly aft.

Figure 2A:
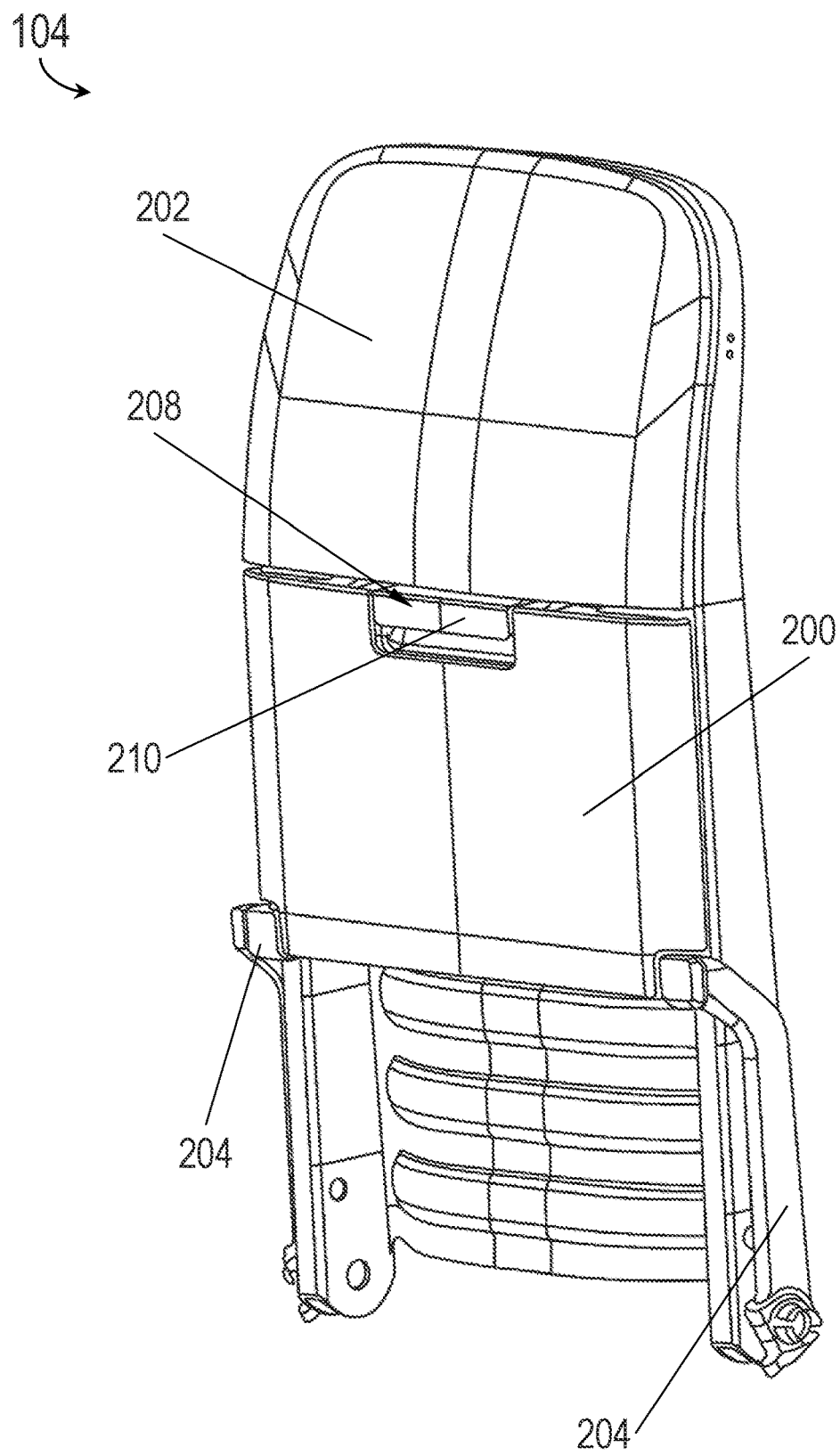
FIG. 2A is an isometric view of a rear seatback surface and integrated meal tray of the passenger seating assembly of FIGS. 1A-F according to example embodiments of this disclosure.
Figure 2B:
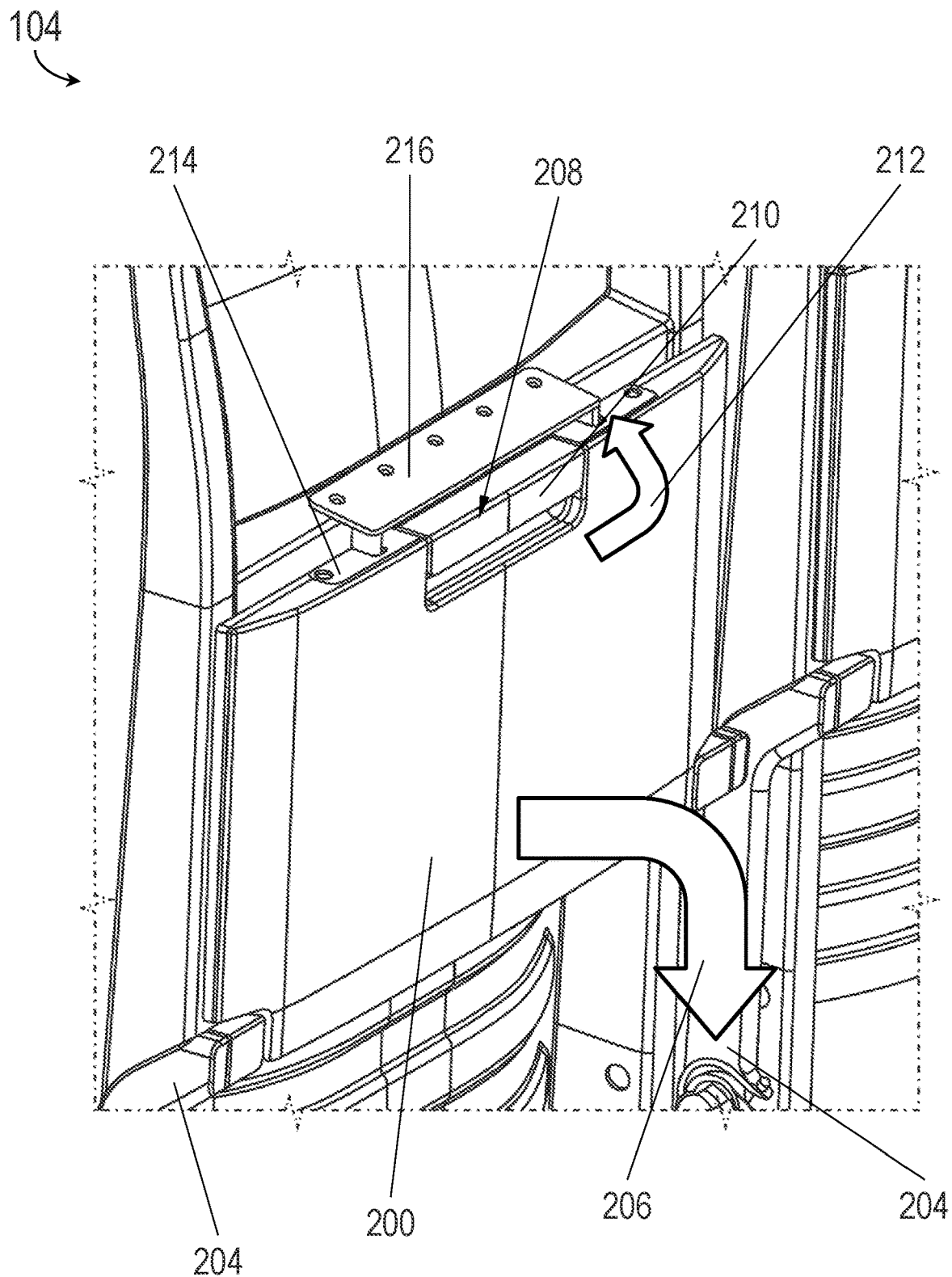
FIG. 2B is a detailed isometric view of the integrated meal tray with low-profile handle of FIG. 2A.

Referring now to FIGS. 2A and 2B, the seatback 104 of the passenger seat (102, FIGS. 1A-1F) is shown.

In embodiments, the seatback 104 may include a rear surface oriented toward a passenger seated directly behind the passenger seat 102 (e.g., in a similar passenger seat, the passenger seat one of a group of such passenger seats similar to the passenger seat assembly (100, FIGS. 1A-1F)). For example, the rear surface of the seatback 104 may comprise a meal tray 200 and an upper portion 202 together defining a continuous contoured seatback (which may in turn be appropriately upholstered, cushioned, and/or padded, e.g., as shown by FIGS. 1A-F). In some embodiments, the upper portion 202 may incorporate an IFE device (122, FIG. 1B).

In embodiments, the meal tray 200 may be attached to the seatback 104 by brackets 204 on its left and right sides. For example, the brackets 204 may pivot or rotate relative to the seatback when the meal tray 200 is released from the stowed configuration shown by FIGS. 2A and 2B, allowing the meal tray to pivot and rotate downward (206) into a deployed configuration. When in the deployed configuration, the meal tray 200 may be maintained by the brackets 204 in a substantially horizontal orientation relative to the cabin floor (e.g., which may account for an inflight angle of the aircraft).

In embodiments, the meal tray 200 may include a handle 208 capable of deploying the meal tray from its stowed configuration to the deployed configuration. For example, the handle 208 may have an outer face 210 flush with the contoured seatback 104 defined by the exterior surface of the meal tray 200 and the upper portion 202, such that the outer face 210 does not protrude or extend beyond either the exterior surface of the meal tray or the upper portion. In embodiments, the passenger occupying the passenger seat directly behind the passenger seat 102 (e.g., and toward whom the seatback 104 and meal tray 200 are oriented) may deploy the stowed meal tray by raising (212) the outer face 210 into a release configuration. For example, when the handle 208 is in the release configuration the meal tray 200 may be released from the seatback 104, and the passenger may guide the meal tray downward (206, FIG. 2A) into its deployed configuration (e.g., as opposed to a conventional meal tray with a latch coupled to the seatback rather than the meal tray, wherein the released meal tray may freely drop unless caught by the passenger).

In embodiments, the handle 208 and meal tray 200 may include an upper bracket 214 (e.g., latch box) also detachable from the seatback 104. Similarly, in embodiments the passenger may return a deployed meal tray 200 to its stowed configuration (as shown by FIGS. 2A and 2B) via the handle 208, which may be returned to the upper bracket 214 and, when released by the passenger, may be rotated (e.g., via an internal spring) back into its stowed configuration, securely stowing the meal tray 200. In embodiments, the seatback 104 may further include a striker 216 attached to the seatback.

Referring now to FIGS. 3A and 3B, the handle 208 and meal tray 200 are shown.

In embodiments, the handle 208 is shown by FIG. 3A in its stowed configuration. For example, the handle 208 may be maintained in the stowed configuration by the spring 302 until articulated by a passenger into the release configuration shown by FIG. 3B.

In embodiments, the handle 208 may comprise, in addition to the outer face 210, an upper face 304. For example, the outer face 210 and the upper face 304 may together define an angle that may preferably be substantially perpendicular, but may include any angle allowing the outer face to be maintained substantially flush with the contoured exterior surface of the meal tray 200 and upper portion 202 shown by FIGS. 2A and 2B. For example, the angle between the outer face 210 and upper face 304 may be acute or obtuse, such that the outer face contours to the exterior surface of the meal tray 200 and the upper face contours to a bezel/upper surface of the meal tray.

In embodiments, the handle 208 may be attached to the meal tray 200 via a shaft 306 defining a lateral axis around which the handle may pivot or rotate. For example, a passenger may articulate (212, FIG. 2B) the handle 208 (e.g., to release the stowed meal tray 200) by pivoting the outer face 210 upward (as shown by FIG. 3B).

In embodiments, the upper bracket 214 of the meal tray 200 may include a latch pin bracket 308. For example, the latch pin bracket 308 (along with a latch pin, shown below in FIGS. 4A through 4D) may maintain the meal tray 200 in its stowed configuration relative to the striker 216 and seatback (104, FIGS. 2A and 2B) while the handle 208 is likewise in its stowed configuration. However, when the handle 208 is articulated (212) by the outer face 210 into its release configuration (e.g., as shown by FIG. 3B), the upper face 304 may engage (310) with the latch pin bracket 308, causing the latch pin (e.g., along with the latch pin bracket and meal tray 200, within which the latch pin bracket and latch pin are incorporated) to disengage from the striker 216 and releasing the meal tray for deployment. Similarly, when the meal tray 200 is returned by the passenger to the stowed configuration, the handle 208 may be returned to the seatback 104 and allowed to rotate upward (e.g., via the spring 302) into its stowed configuration (e.g., as shown by FIG. 3A), allowing the latch pin, latch pin bracket 308, upper bracket 214, and meal tray to re-engage with the striker 216 and likewise maintain the meal tray in the stowed configuration.

Figure 4A:
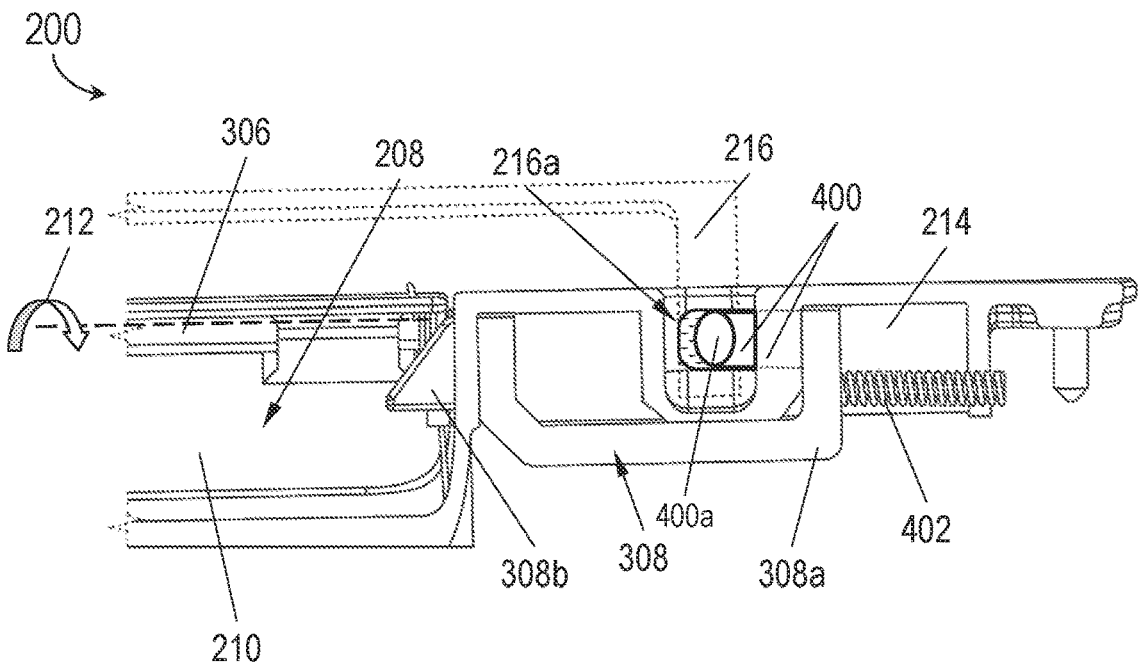
FIG. 4A is an internal cross section.
Figure 4B:
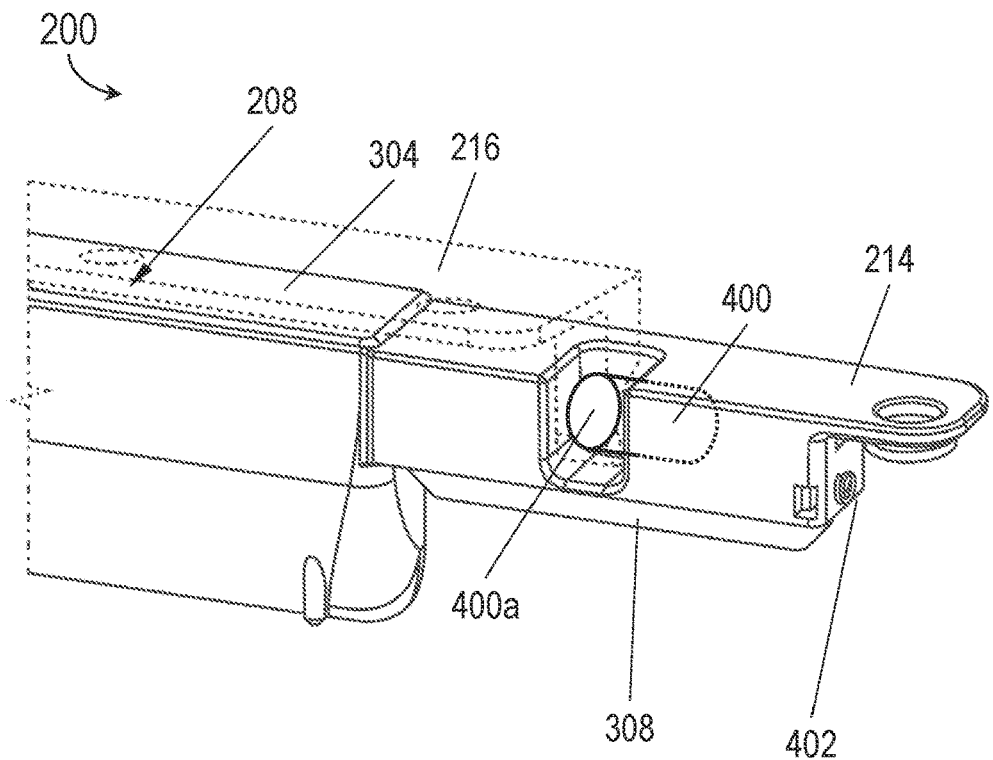
FIG. 4B is an internal isometric view, of the integrated meal tray and low-profile handle of FIGS. 2A and 2B in a stowed configuration.

Referring now to FIGS. 4A and 4B, the handle 208 and upper bracket 214 of the meal tray 200 are shown in their respective stowed configurations. FIG. 4A shows the handle 208 and upper bracket 214 looking toward the rear, e.g., toward a passenger occupying a seat directly behind the meal tray 200 and by whom the meal tray is configured for use.

In embodiments, the handle 208 comprising the outer face 210 and upper face 304 may pivot (212) relative to the shaft 306 (e.g., and to the lateral axis defined by the shaft). For example, as noted above the handle 208 may be maintained in its stowed configuration (likewise maintaining the meal tray 200 in its stowed configuration (FIGS. 2A-2B)) when not otherwise engaged by a passenger.

In embodiments, the latch pin bracket 308 and latch pin 400 may be removably set into the striker 216 (e.g., within a striker hole 216a) and the latch pin may be maintained within the striker hole, e.g., by a latch pin spring 402 extending in a lateral direction (e.g., substantially parallel to the shaft 306), in a position to engage with the handle 208 (e.g. via the angled inner end 308b of the latch pin bracket) and maintain the handle and meal tray 200 in their stowed configurations. For example, the latch pin bracket 308 may have a first end 308a, or outer end, engaged with the latch pin spring 402 and a second end 308b, or inner end, engaged with the handle 208.

In embodiments, the latch pin bracket 308 and latch pin 400 may be disposed beneath the rear surface of the seatback (104, FIG. 2A; e.g., the exterior surface of the meal tray 200 and upper portion 202 as shown by FIGS. 2A and 2B). For example, as shown by FIGS. 4B and 4D, the latch pin bracket 308 and latch pin 400 may be at least partially concealed from view by the upper bracket 214.

Figure 4C:
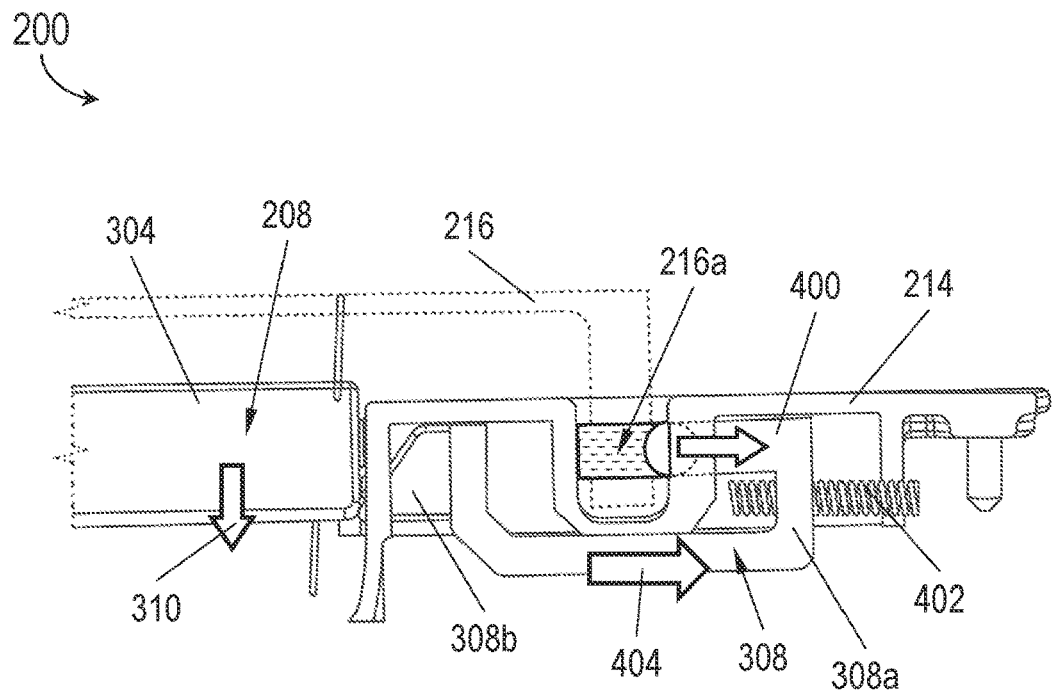
FIG. 4C is an external cross section.
Figure 4D:
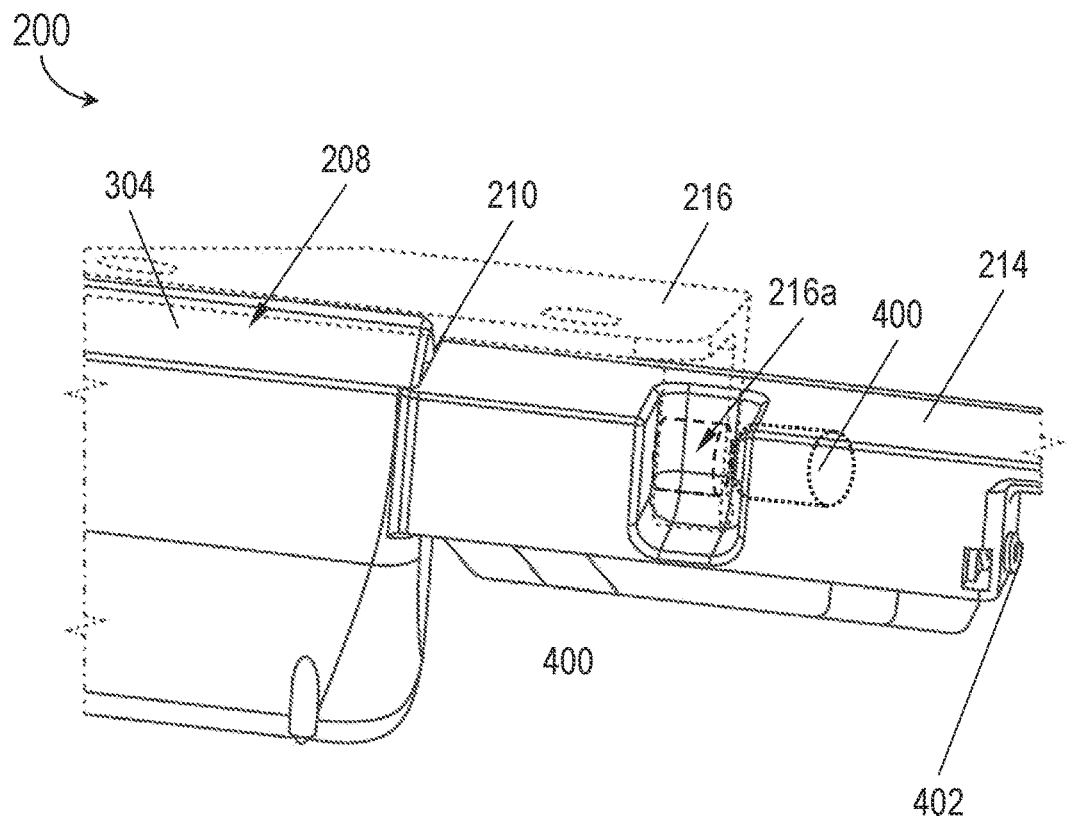
FIG. 4D is an internal isometric view, of the integrated meal tray and low-profile handle of FIGS. 2A and 2B in a release configuration.
Figure 4E:
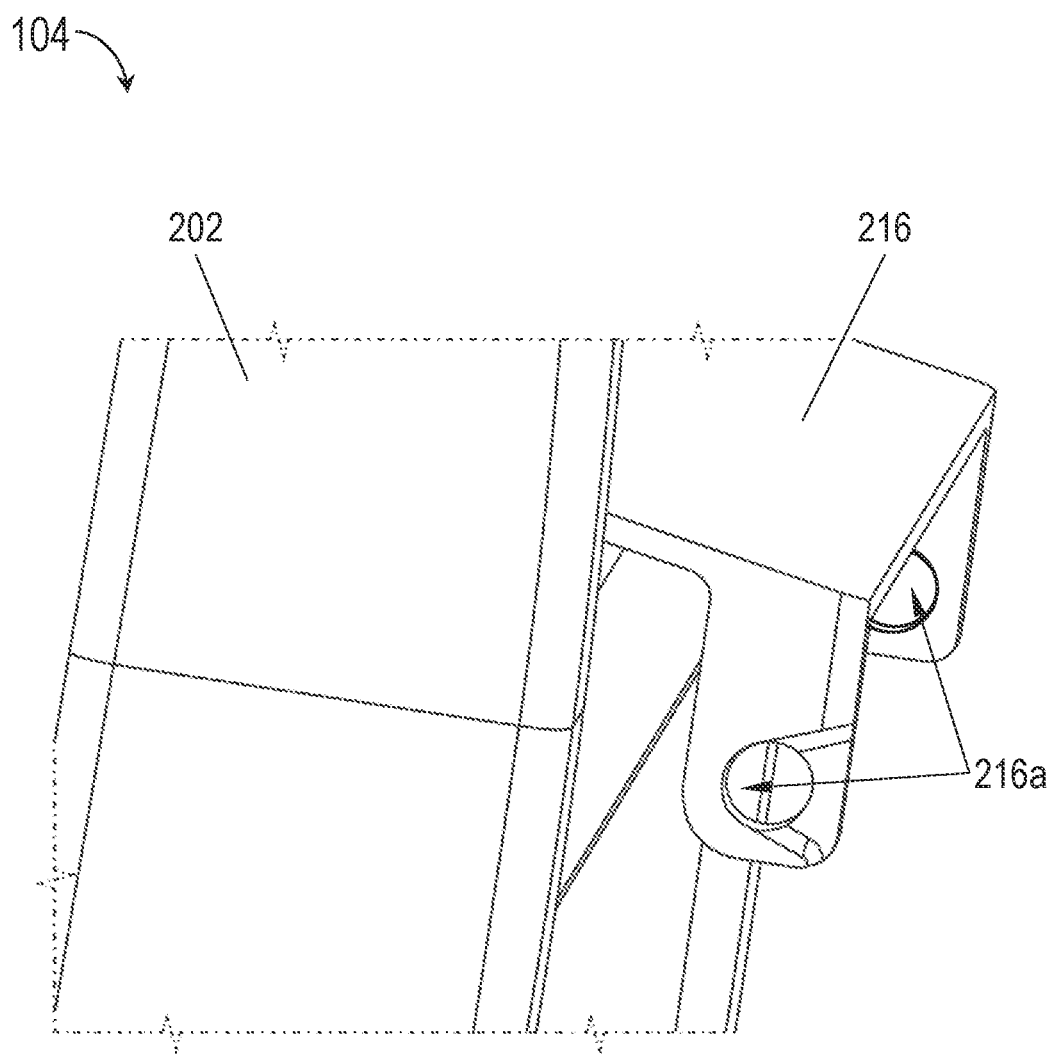
FIG. 4E is a left-side isometric view of the rear seatback surface of FIG. 2A featuring the striker and striker holes thereof.

Referring also to FIGS. 4C and 4D, the handle 208 and upper bracket 214 of the meal tray 200 of FIGS. 4A and 4B are shown in a release configuration wherein the meal tray may be deployed. Referring also to FIG. 4E, the striker 216 and striker hole 216a are shown.

In embodiments, the inner end 308b of the latch pin bracket 308 may comprise an angled portion directly engaged with the handle 208. For example, when the outer face 210 of the handle 208 is articulated (212, FIG. 3A), the upper face 304 of the handle may be pivoted toward and may engage (310) with the angled inner end 308b, driving the latch pin bracket 308 and latch pin 400 in a lateral direction (404; e.g., parallel to the shaft 306 and the latch pin spring 402) and disengaging the latch pin from the hole 216a through the striker 216. Thus disengaged, the meal tray 200 may be pivoted or lowered (206, FIG. 2A) into its deployed configuration. Similarly, when the meal tray 200 is returned to the stowed configuration by the passenger, the upper face 210 of the handle 208 may engage the angled inner end 308b and may then be driven back into the stowed configuration (FIGS. 4A and 4B) by the spring (302, FIGS. 3A and 3B), allowing the latch pin 400 to re-engage through the hole 216a in the striker 216 and maintain the meal tray in the stowed configuration.

In embodiments, the latch pin 400 may (e.g., similarly to the latch pin bracket 308) have an angled face (400a, FIG. 4A) such that, when disengaged from or re-engaged with the striker 216, the latch pin 400 may similarly be pushed out of the way of the striker until encountering the hole 216a through the striker, whereby the latch pin 400 may be driven into the hole 216a to release the meal tray 200 from, or secure the meal tray to, the striker. Similarly, in embodiments the meal tray 200 may be re-stowed to the seatback 104 without engaging the handle 208. For example, when the meal tray 200 is pushed back toward its stowed configuration, the latch pin 400 and latch pin bracket 308 may self-secure the meal tray 200 in the stowed configuration as described above.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A passenger seat meal tray assembly with a low-profile inline latch, comprising:
   a tray pivotably coupled to a seatback of a passenger seat, the tray configured to pivot between a stowed configuration and a deployed configuration, the tray comprising:
      an exterior surface substantially flush with a rear surface of the seatback when the tray is stowed; and
      an interior surface configured to be used by a passenger when the tray is deployed;
   a latch pin assembly mounted to the tray and having at least an engaged configuration and a disengaged configuration,
      the latch pin assembly held in the engaged configuration by at least one spring, the spring extending parallel to a lateral axis and configured to hold the tray in the stowed configuration while engaged with the seatback;
   and
   a handle pivotably attached to the tray by a shaft, the handle having at least a stowed configuration and a release configuration, the handle comprising an upper face attached to an outer face, the outer face aligned with the exterior surface of the tray and with the rear surface of the seatback when the handle is stowed,
      the outer face of the handle configured to be pivotably articulated around the lateral axis by the passenger from the stowed configuration to the release configuration, the upper face of the handle when in the release configuration configured to disengage the latch pin assembly from the seatback and deploy the tray by driving the latch pin assembly toward the spring along the lateral axis.

2. The passenger seat meal tray assembly of claim 1, wherein the upper face and the outer face of the handle define a substantially right angle.

3. The passenger seat meal tray assembly of claim 1, wherein:
   the latch pin assembly comprises an inner end and an outer end opposite the inner end;
   wherein the outer end of the latch pin assembly is configured to engage the spring;
   and
   wherein the inner end of the latch pin assembly comprises an angled surface, the upper face of the handle configured to engage the latch pin assembly via the angled surface.

4. The passenger seat meal tray assembly of claim 3, wherein:
   the latch pin assembly comprises at least one latch pin proximate to the outer end,
   the at least one latch pin configured to maintain the meal tray in the stowed configuration by engaging with the seatback,
   wherein the at least one latch pin is configured to be disengaged from the seatback by the disengaging of the latch pin assembly.

5. The passenger seat meal tray assembly of claim 4, wherein:
- the seatback includes a striker with at least one striker hole set thereinto, the striker hole configured to accommodate the latch pin when the latch pin assembly is in the engaged configuration; and
- wherein the driving of the latch pin assembly toward the spring disengages the latch pin assembly by releasing the latch pin from the striker hole.

6. The passenger seat meal tray assembly of claim 1, wherein the handle when in the release configuration is configured to re-engage the latch pin assembly with the seatback and return the tray to the stowed configuration.

7. The passenger seat meal tray assembly of claim 6, wherein the handle is configured to re-engage the latch pin assembly with the seatback when the tray is articulated toward the stowed configuration by a user without engaging the handle.

8. A passenger seating assembly, comprising:
- one or more passenger seats, each passenger seat configured to be occupied by a first passenger and having a seatback comprising a rear surface oriented toward a second passenger seated directly behind the first passenger;
- each passenger seat further comprising:
  - a tray pivotably coupled to the seatback and configured to pivot between a stowed configuration and a deployed configuration, the tray comprising:
    - an exterior surface substantially flush with the rear surface when the tray is stowed; and
    - an interior surface configured to be used by the second passenger when the tray is deployed;
  - a latch pin assembly mounted to the tray and having at least an engaged configuration and a disengaged configuration,
    - the latch pin assembly held in the engaged configuration by at least one spring, the spring extending parallel to a lateral axis and configured to hold the tray in the stowed configuration while engaged with the seatback; and
  - a handle pivotably attached to the tray by a shaft, the handle having at least a stowed configuration and a release configuration, the handle comprising an upper face attached to an outer face, the outer face aligned with the exterior surface of the tray and with the rear surface of the seatback when the handle is stowed,
    - the outer face of the handle configured to be pivotably articulated around the lateral axis by the second passenger from the stowed configuration to the release configuration, the handle when in the release configuration configured to disengage the latch pin assembly from the seatback and deploy the tray by driving the latch pin assembly toward the spring along the lateral axis.

9. The passenger seating assembly of claim 8, wherein the upper face and the outer face of the handle define a substantially right angle.

10. The passenger seating assembly of claim 8, wherein:
- the latch pin assembly comprises an inner end and an outer end opposite the inner end;
- wherein the latch pin assembly is configured to engage the spring via the outer end; and
- wherein the inner end of the latch pin assembly comprises an angled surface, the upper face of the handle configured to engage the latch pin assembly via the angled surface.

11. The passenger seating assembly of claim 10, wherein:
- the latch pin assembly comprises at least one latch pin proximate to the outer end,
- the at least one latch pin configured to maintain the meal tray in the stowed configuration by engaging with the seatback,
- wherein the at least one latch pin is configured to be disengaged from the seatback by the disengaging of the latch pin assembly.

12. The passenger seating assembly of claim 11, wherein:
- the seatback includes a striker with at least one striker hole set thereinto, the striker hole configured to accommodate the latch pin when the latch pin assembly is in the engaged configuration; and
- wherein the driving of the latch pin assembly toward the spring disengages the latch pin assembly by releasing the latch pin from the striker hole.

13. The passenger seating assembly of claim 8, wherein the handle when in the release configuration is configured to re-engage the latch pin assembly with the seatback and return the tray to the stowed configuration.

14. The passenger seating assembly of claim 13, wherein the handle is configured to re-engage the latch pin assembly with the seatback when the tray is articulated toward the stowed configuration by a user without engaging the handle.

15. The passenger seating assembly of claim 8, wherein the passenger seating assembly is an aircraft seating assembly embodied in an aircraft passenger cabin and comprising between two and five passenger seats.

* * * * *